United States Patent
Hoffnung et al.

(10) Patent No.: US 11,709,750 B2
(45) Date of Patent: Jul. 25, 2023

(54) DYNAMICALLY MAPPING SOFTWARE INFRASTRUCTURE UTILIZATION

(71) Applicant: International Business Machines Corporation, Armonk, NY (US)

(72) Inventors: Itzhak Hoffnung, Givatayim (IL); Eliezer Atzaba, Modiin-Macabim-Reut (IL); Oleg Datsenko, Ashdod (IL); Hila Radoshinsky, Tel Aviv (IL); Dany Volk, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 16/872,452

(22) Filed: May 12, 2020

(65) Prior Publication Data

US 2021/0357302 A1 Nov. 18, 2021

(51) Int. Cl.
*G06F 11/30* (2006.01)
*G06F 11/34* (2006.01)
*G06F 9/50* (2006.01)
*G06F 3/0482* (2013.01)

(52) U.S. Cl.
CPC ........ *G06F 11/3086* (2013.01); *G06F 3/0482* (2013.01); *G06F 9/5005* (2013.01); *G06F 11/3428* (2013.01); *G06F 11/3466* (2013.01); *G06F 2201/835* (2013.01)

(58) Field of Classification Search
CPC .. G06F 11/3086; G06F 3/0482; G06F 9/5005; G06F 11/3428; G06F 11/3466; G06F 2201/835; G06F 9/5011; G06F 2209/508; G06F 9/44505
See application file for complete search history.

(56) References Cited

U.S. PATENT DOCUMENTS

| 8,359,389 | B1 * | 1/2013 | Cohen | H04W 24/00 |
| | | | | 709/224 |
| 8,661,157 | B2 | 2/2014 | Scott et al. | |
| 8,954,935 | B2 * | 2/2015 | Kew | G06F 11/3466 |
| | | | | 717/130 |

(Continued)

FOREIGN PATENT DOCUMENTS

WO    WO-2016118162 A1 *  7/2016

OTHER PUBLICATIONS

IT Performance Monitoring Solution—Features & Tools 1 eG Innovations, Dec. 6, 2019 https://www.eginnovations.com/it-monitoring/features , Published in eG Enterprise.

(Continued)

*Primary Examiner* — Matthew J Brophy
(74) *Attorney, Agent, or Firm* — Kelli D. Morin

(57) ABSTRACT

A computer-based system and method for real-time monitoring of computer resource usage, including obtaining, by a monitoring application executed by a processor, from a plurality of applications, each application executed by a processor, a report upon the accessing of at least one accessed resource by at least one accessing user; and generating, by the monitoring application based on the report, a map of resources accessed by the plurality of applications. If a notification that a resource has been compromised is obtained, a list of all applications that have accessed the resource may be generated based on the map.

19 Claims, 8 Drawing Sheets

(56) References Cited

U.S. PATENT DOCUMENTS

| | | | |
|---|---|---|---|
| 9,053,337 B2 | 6/2015 | Carrara et al. | |
| 9,405,653 B1* | 8/2016 | Kew | G06F 11/3466 |
| 9,935,812 B1* | 4/2018 | Cirne | G06F 11/36 |
| 10,069,710 B2* | 9/2018 | Boyapalle | H04L 67/1001 |
| 11,068,314 B2* | 7/2021 | Roy | G06F 12/0842 |
| 2003/0056200 A1* | 3/2003 | Li | G06F 11/323 714/E11.181 |
| 2009/0199196 A1* | 8/2009 | Peracha | G06F 11/3409 707/E17.014 |
| 2009/0276762 A1* | 11/2009 | Ponitsch | G06F 11/3692 717/130 |
| 2010/0082320 A1* | 4/2010 | Wood | G06F 11/3457 718/1 |
| 2010/0153319 A1* | 6/2010 | Abrahao | G06F 11/3414 706/12 |
| 2012/0054763 A1* | 3/2012 | Srinivasan | G06F 9/5005 718/104 |
| 2013/0067378 A1* | 3/2013 | Au | G06F 11/32 715/771 |
| 2014/0282430 A1* | 9/2014 | Kew | G06F 11/3644 717/130 |
| 2018/0337817 A1* | 11/2018 | Cirne | H04L 69/329 |
| 2019/0089810 A1* | 3/2019 | Wu | G06F 9/5005 |
| 2019/0386885 A1* | 12/2019 | Yalakanti | H04L 43/045 |
| 2021/0208945 A1* | 7/2021 | Yamamoto | G06F 9/5038 |

OTHER PUBLICATIONS

Server & Application Monitoring with total visibility—from the URL to the line of code https://www.manageengine.com/products/applications_manager/ Printed on Dec. 6, 2019.

Resource Monitoring For Remote Applications Link: http://www.admin-magazine.com/HPC/Articales/REMORA; Published in HPC—Admin Magazine Printed on Dec. 6, 2019.

7 Requirements for Monitoring Cloud Apps and Infrastructure Link: https://newrelic.com/resource/cloud-monitoring-platorm-requirements Published In: New Relic Printed on Dec. 4, 2019.

The NIST Definiton of Cloud Computing: Recommendations of the National Institute of Standards and Technology; Peter Mell and Timothy Grance, Sep. 2011.

"Modern Service Nerworking for Cloud and Microservices" May 13, 2019; https://www.hashicorp.com/resources/modern-service-networking-cloud-microservices.

* cited by examiner

DYNAMICALLY MAPPING SOFTWARE INFRASTRUCTURE UTILIZATION

FIELD OF THE INVENTION

The present invention relates generally to dynamically mapping computer software infrastructure utilization.

BACKGROUND

When an application or software code is being executed by a processor, the applications or software code needs to use or access various computer resources or software infrastructure. The resources may include servers or computers executing the application, memory, databases and storage the application is using, other applications that the application may call, etc.

Nowadays many software solutions are moving towards a more containerized, scalable, multi-service solutions. Software environments (e.g., a developer's machine, on-premises data centers, the public cloud, etc.) may include up to hundreds or thousands of small applications or services, each with independent deployment. Applications may communicate with each other or with other services or resources. Currently, a configuration file describing those interdependencies is defined manually by a configuration file. Thus, a new application or service that is deployed may be unknown to other applications until it is added manually to a configuration file.

Manual management of applications may be prone to errors due to mistakes made by the information technology (IT) personnel that have to manually update the configuration files, and due to changes and upgrades that may be made to applications and may not be reported to the IT personnel, and therefore not updated in the configuration files. This may lead to an undesired situation in which interdependencies and resource utilization by applications is not known or not accurate.

Therefore, a method for dynamic and accurate mapping of software infrastructure utilization, and specifically mapping of applications and resources interdependencies is required.

SUMMARY

According to embodiments of the invention, a system and method for dynamically mapping software infrastructure utilization and for real-time monitoring of resource usage may include: accessing a computer resource by a software application executed by a processor; and upon accessing the resource, reporting, by the software application to a monitoring application, the access to the resource and identity of a user accessing the resource.

Embodiments of the invention may include requesting by the software application, a permission to access the resource by the user accessing the resource.

According to embodiments of the invention, reporting may be performed by a dedicated command inserted into the software application.

According to embodiments of the invention, the report may include metadata, the metadata comprising at least one of: a timestamp and a protocol.

According to embodiments of the invention, the resource may be selected from the list consisting from: a database, a server, and a computer-executed software application.

According to embodiments of the invention, a system and method for dynamically mapping software infrastructure utilization and for real-time monitoring of resource usage may include: obtaining, by a monitoring application executed by a processor, from a plurality of applications, each application executed by a processor, a report upon the accessing of at least one accessed resource by at least one accessing user; and generating, by the monitoring application based on the report, a map of resources accessed by the plurality of applications.

Embodiments of the invention may include obtaining, by the monitoring application, a notification that a resource has been compromised; and generating a list of all applications that have accessed the resource based on the map.

Embodiments of the invention may include obtaining, by the monitoring application, from an application, a report of accessing an accessed resource by an accessing user, wherein the application is not permitted to access the accessed resource; obtaining, by the monitoring application from the application, a request to permit access to a requested resource by a requested user; and allowing the request, by the monitoring application, only if the requested resource is the accessed resource and the requested user is the accessing user.

Embodiments of the invention may include presenting the map in a graphical user interface, wherein the map includes at least one of:
per application presention—for each application, presenting resources accessed by that application,
per resource presentation—for each resource, presenting applications that have accessed that resource, and
a graph view—presenting visualization of applications, resources and access between them.

According to embodiments of the invention, the report may include metadata, the metadata may include at least one of: a timestamp and a protocol.

Embodiments of the invention may include analyzing the metadata against a set of rules; and indicating in the graphical user interface which applications do not comply with a rule of the plurality of rules.

Embodiments of the invention may include calculating a risk factor of a resource based on the map, for example the risk factor may equal a maximal risk factor associated with any of the resources accessed by the resource.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
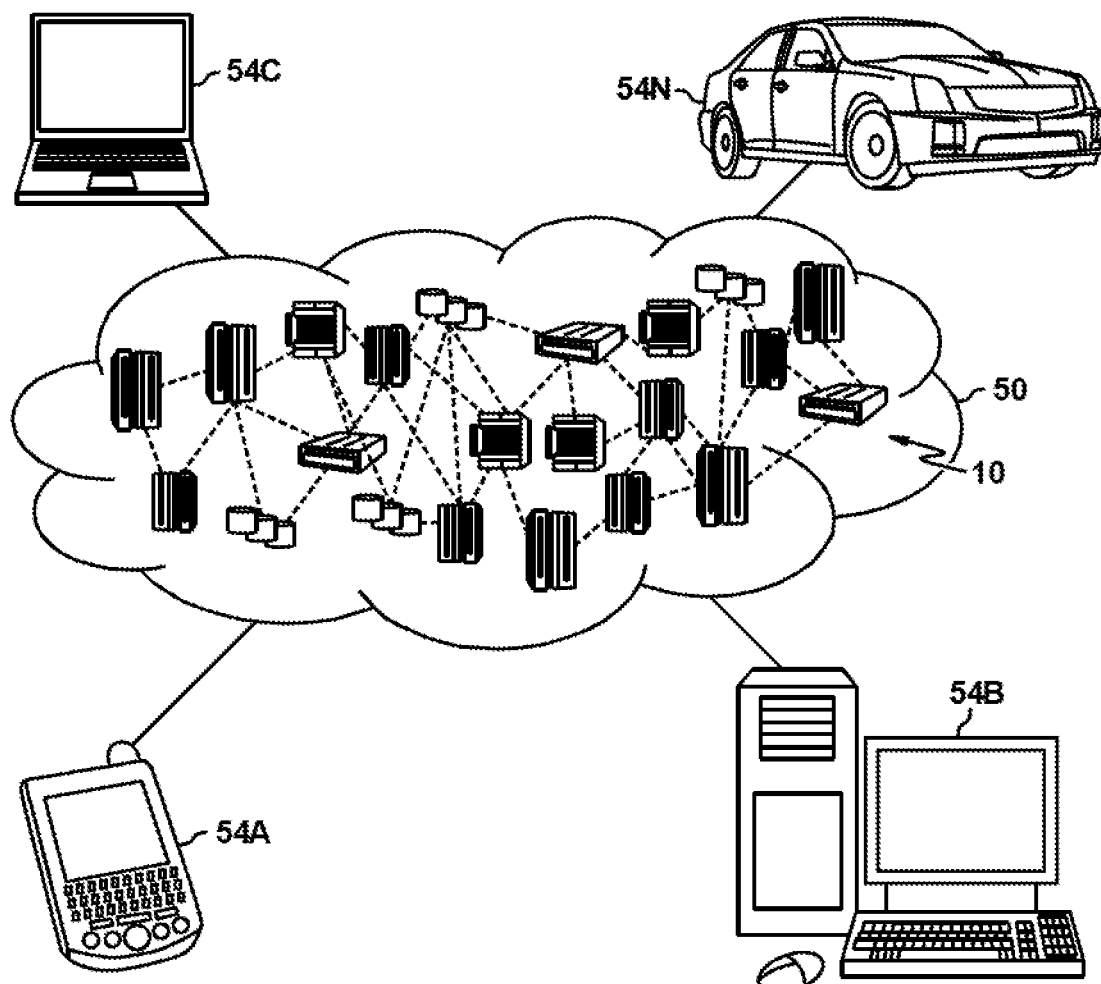
FIG. 1 depicts an illustrative cloud computing environment, according to embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, computer servers, processing, memory, storage, computer-executed software applications, virtual machines, and computer services) that can be rapidly provisioned and released with minimal management effort or interaction with a provider of the service. Example cloud model may include for example five characteristics, at least three service models, and at least four deployment models.

Characteristics may be for example:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be for example:

Software as a Service (SaaS): the capability provided to the consumer is to use the provider's computer-executed software applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database-as-a-Service (DBaaS): the capability provided to the consumer is to store data an a cloud infrastructure. DBaaS paradigm is a common approach for storing data in a cloud based computerized service, where users get access to data without the need for managing hardware or software.

Deployment Models may be for example:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Modern applications are many times dependent on open-source packages. This may impose a risk since malicious code may be "injected" into an open-source application and cause a supply chain attack. In case of an attack, it may be important to know which applications and resources might be damaged. For example, it may be important to know which applications are affected, which bucket (e.g., a logical unit of storage in a cloud computing environment, optionally implemented on virtual storage 72) might have a data breach, who is the technical manager of an application, what open-source packages does an application use, etc.

Currently, a service agent describing those interdependencies is defined manually by a configuration file in a process that is prone to errors. Thus, interdependencies and resource utilization by applications is not fully known or not accurate. Unfortunately, if interdependencies and relations between applications and resources are not known, finding all affected resources and applications may be very hard in case of an attack.

Embodiments of the invention may provide a system and method for dynamically mapping software infrastructure utilization by real-time monitoring of resource usage. A resource used by an application may include any hardware or software infrastructure used by an application, including for example, a database (deployed in a cloud environment or on premises), another computer-executed application, open-source packages used by the application, networks, servers, memory, storage, buckets, virtual machines, used docker containers status, queue services (e.g., message brokers) on premise or in the cloud, authentication services, caching services, logs files and log services, etc.

According to embodiments of the invention, an application that accesses a resource may automatically self-report the access in real-time (e.g., immediately before or after, or sometime before or after) to a monitoring application. The report may include metadata describing the access or providing properties of the access. The metadata may include for example the accessed resource, resource information (e.g., on premises or on cloud), a time stamp indicative of the time the access was performed, the identity of a user or group of users accessing the resource, identity of a technical manager of the application, open-source packages used by the application, the protocol used for accessing the resource, availability of used cloud services, storage usage information (on premise or in the cloud), etc. In some embodiments, the reported metadata may be divided into custom properties and common properties. The common properties may include properties that must be included in a report for a given resource type, kind or category. For example, common properties included in a report of an access to a database may include the database host name. If the database host name is defined as a common property, the database host name must be included in a report of an access to any database. Custom properties may include other information relevant to a specific resource type, kind or category, that may be included in the metadata but is not mandatory. For example, custom properties included in a report of an access to a database may include the data retention days of the database (e.g., the number of days that data is saved in the database). Thus, when reporting an access to a database, the data retention days of the database may or may not be reported. A user may be a person that is using the application; the application, when used by a user may access a resource. The user may be identified by login identification number (ID) a password and/or other credentials. The reporting may be performed, for example, by dedicated command inserted to the software code of the application right before or right after the command to access the resource. Thus, the report is provided in real-time as the application is being executed.

According to embodiments of the invention, a monitoring application may obtain the report from a plurality of applications or from all the applications running in the monitored environment (e.g., a service provided by an organization, an organization infrastructure, a computing system, etc.). The monitoring application may thus obtain and gather information regarding application accesses to resources and may dynamically generate a map of infrastructure utilization, or resources accessed by the plurality of applications, based on the obtained information. Thus, interdependencies and resource utilization by applications may become known and accurate. Therefore, embodiments of the invention may improve the technology of resource utilization management by providing a dynamic and accurate mapping of resource utilization.

According to embodiments of the invention, the mapping of resource utilization may be used to assist in decision making, for example, to limit access to a resource based on supplied information or not assign more resources to a team that is not using resources assigned to the team as expected. Furthermore, management can examine the resources used by applications in the organization and make decisions regarding cost effectiveness, shifting resources to cloud form on premise etc.

Furthermore, by providing an updated and accurate map of interdependencies and resource utilization by applications, embodiments of the invention may enable to accurately determine which applications, databases and other resources may be at risk in case a breach or an attack is detected in one application or resource. For example, if the monitoring application obtains a notification that a resource has been compromised, the monitoring application may generate an accurate list of all applications that have communicated with the resource (accessed the resource or have been accessed by the resource) based on the map. Specifically, an event of a supply chain attack in which a malicious code has been injected into an open source library, may be handled better and perhaps prevented, since applications that use the malicious package may be easily identified.

Embodiments of the invention may present the map in a graphical user interface, in a configuration selected by the user from, the map including for example:

Per application presentation—for each application, presenting resources accessed by that application.

Per resource presentation—for each resource, presenting applications that have accessed that resource.

A graph view—presenting visualization of applications, resources and access between them.

According to embodiments of the invention, reporting of access to a resource may serve as an obligating requirement in order to obtain a permission for a user or for the application to access that resource or as an obligating requirement in order to obtain a permission for users to use or execute the application. For example, in many organizations, users may have permissions to use applications and resources. Users may use an application or access a resource only if they have permission to do so. Thus, according to embodiments of the invention, a permission to use an application may be provided to a user or a group of users only if the application has reported to the monitoring application which users need to be permitted to access which resources when using the application.

According to embodiments of the invention, when a new application is deployed for the first time, no users may have permission to use the new application. When executed for the first time, the application may report to the monitoring application which users need to be permitted to access which resources when using this application. Only after the report is received or in response to the report being received by the monitoring application, and based on the group of users and other metadata specified in the report, the monitoring application may issue permissions for users to use the new application. Thereafter, the application may report to the monitoring application on each access to each resource, including metadata or information describing access parameters. Thus, a change in connection parameters of a running application will be dynamically reported to the monitoring application, and the map of interconnections will be updated.

Thus, embodiments of the invention may provide a broad and detailed picture of resource usage information (on premise or cloud) and of the inner network of software infrastructure utilization, including which applications are interacting with which applications and resources and in what channels. Embodiments of the invention may provide a tool for day-to-day supervision of the software, and a tool for examining security breaches. Since each application self-reports access to resources in real-time, the dynamic and updated map of resources accessed by applications in the computer system may be generated. Additionally, embodiments of the invention may provide the dynamic and updated map of resources accessed by applications without tracking, monitoring and reading network traffic, which may be cumbersome and require computing resources. Thus, embodiments of the invention may provide improved and enhanced performance of computer systems while using less computing resources.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. Cloud computing environment is typically located remotely from its users. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
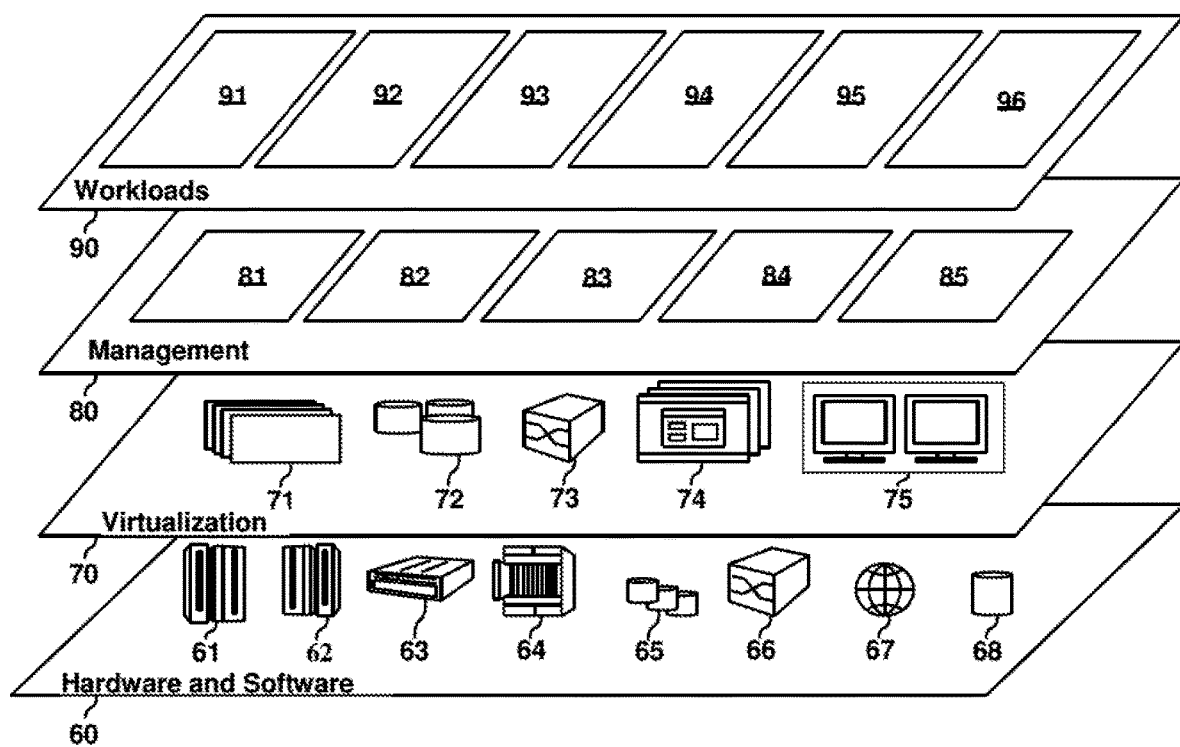
FIG. 2 depicts a set of functional abstraction layers provided by cloud computing environment, according to embodiments of the invention.
Figure 8:
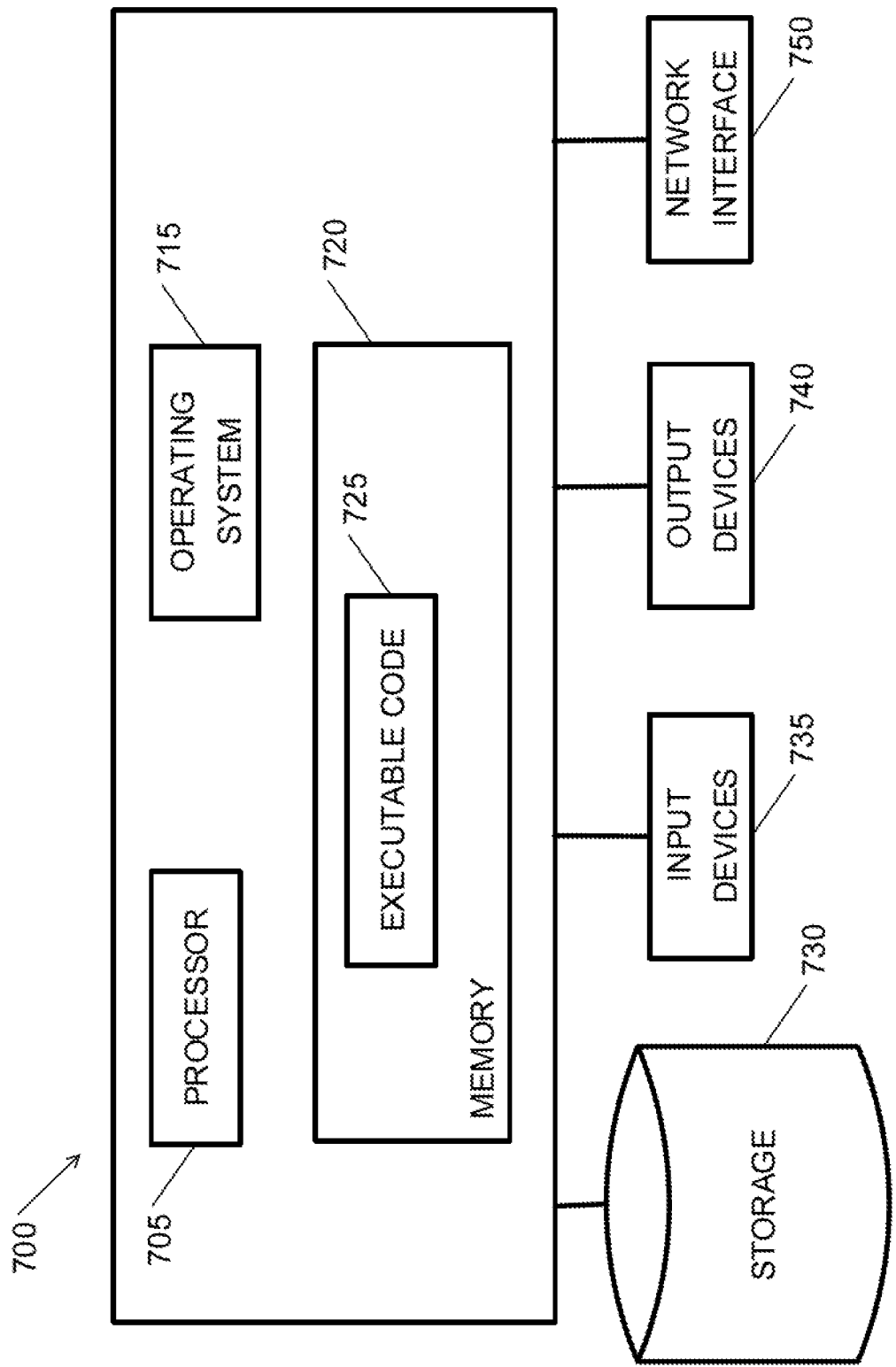
FIG. 8 illustrates an example computing device according to an embodiment of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components, such as the hardware and software components depicted in FIG. 8. Examples of hardware components include: processors (e.g., processor 705 depicted in FIG. 8) such as mainframes 61, RISC (Reduced Instruction Set Computer) architecture based servers 62, servers 63 and blade servers 64; storage devices 65 (e.g., storage device 730 depicted in FIG. 8); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

The description of workloads layer 90 includes examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

According to embodiments of the invention resources or software infrastructure may include any combination of elements included on premises computer system or on cloud computing environment 50, or a combination thereof. For example, resources, also referred to herein as software infrastructure, may include processors (e.g., processor 705 depicted in FIG. 8) such as mainframes 61, RISC (Reduced Instruction Set Computer) architecture based servers 62, servers 63, blade servers 64, storage devices 65 (e.g., storage device 730 depicted in FIG. 8), networks and networking components 66, network application server software 67, database software 68, virtual servers 71, virtual storage 72, virtual networks 73, including virtual private networks, virtual applications and operating systems 74, virtual clients 75, etc. in addition, resources may include other applications.

Figure 3:
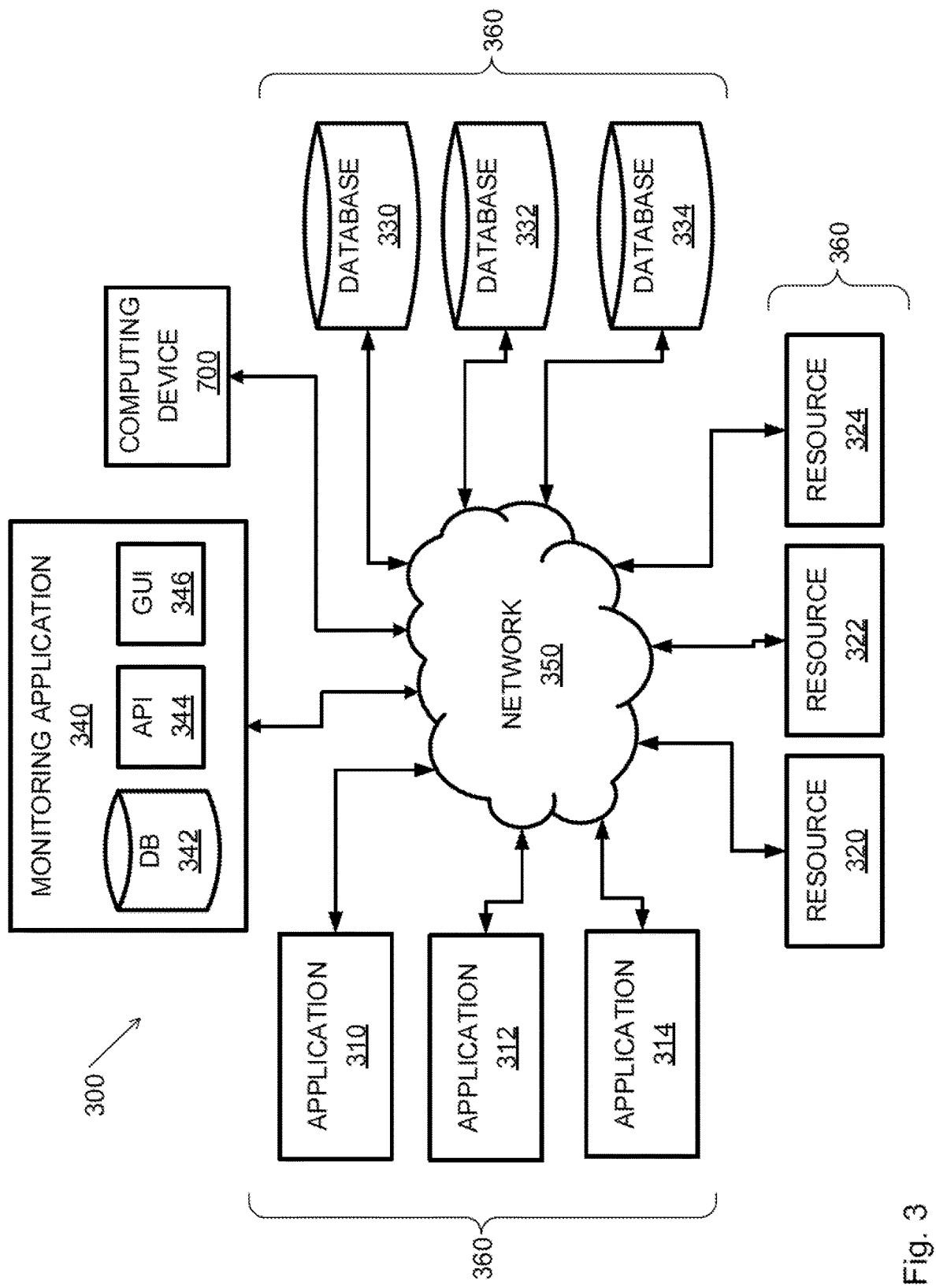
FIG. 3 depicts a computer system, according to embodiments of the invention.

Reference is made to FIG. 3, depicting a computer system 300, according to embodiments of the invention. Computer system 300 may include resources 360 and a monitoring application 340. Resources 360 may include applications 310, 312 and 314 databases 330, 332 and 334, and other types of resources such as servers, network components, storage etc. depicted simply as resources 320, 322 and 324. According to some embodiments, applications 310, 312 and 314, resources 320, 322 and 324, and databases 330, 332 and 334 may be part of or executed by components of an on-premises computer system, a cloud computing environment 50, or a combination thereof. Other implementations may be used. It should be understood that the components, and functions shown in FIG. 3 are intended to be illustrative only and embodiments of the invention are not limited thereto.

Networks 350 may include any type of network or combination of networks available for supporting communication between any one of resources 360 and the other resources 360 and between resources 360 and monitoring application 340. Networks 350 may include for example, a wired, wireless, fiber optic, or any other type of connection, a local area network (LAN), a wide area network (WAN), the Internet and intranet networks, etc. Additionally or alternatively, any of resources 360 and monitoring application 340 may be connected to each other directly.

Applications 310, 312 and 314 may each be executed by a processor (e.g., processor 705 presented in FIG. 8), may access resources 360 of computing system 300 and may be monitored by monitoring application 340. When called upon from another application, each of applications 310, 312 and 314 may be considered as a resource 360 accessed by the other application. For example, application 310 may access database 330, resource 322 (e.g., a server) and may call application 312. According to embodiments of the invention, each of applications 310, 312 and 314 may self-report to monitoring application 340 upon (e.g., immediately before or after, or sometime before or after) accessing a resource 360. For example, each of applications 310, 312 and 314 may self-report to monitoring application 340 upon accessing a resource 360 (e.g. by executing a command line or lines inserted to the software code of the application 310, 312 and 314) for example right before or right after accessing a resource 360. In some embodiments, the report may be implemented by including a dedicated package or library in the code of application 310, 312 and 314, and using the application programming interface (API) of the dedicated package or library in order to report to monitoring application 340 the properties of the access to resource 360.

According to embodiments of the invention, a user may use applications 310, 312 and 314. For example, a user may use a computer, such as computing device 700, to use or execute applications 310, 312 and 314, which may access one or more of resources 360. According to embodiments of the invention, a user may need a permission to use any of applications 310, 312 and 314, and to access any of resources 310, 312 and 314. Furthermore, applications 310, 312 and 314 may require a permission to access one or more of resources 360.

The reporting of the properties is implemented by a processor executing the code of applications 310, 312 and 314. Thus, the report, or self-report, is provided as applications 310, 312 and 314 are being executed. The report may include metadata such as the accessed resource 360, a time stamp, the identity of a user or group of users using the application, the protocol used for accessing resource 360, etc.

For example, assume that when executed, application 312 fetches data from a bucket (e.g., resource 322), so a line of code may be added right after the fetch, leading to an exact report that application 312 interacted with the bucket (e.g. resource 322) at a substantially exact timestamp. For example, if application 314 is a My structured query language database management system (MySQL DB, an open-source relational database management system), a data_retention_days property may be defined to track how long the data persistence for that database is.

According to embodiments of the invention, monitoring application 340 may obtain the report from the plurality of applications 310, 312 and 314. Monitoring application 340 may thus obtain and gather information regarding access of applications 310, 312 and 314 to resources 360 and may generate a map of resources 360 accessed by applications 310, 312 and 314 based on the obtained information, e.g., presenting interconnection between applications 310, 312 and 314 and resources 360 as described in the reports. Thus, infrastructure utilization including interdependencies and resource 360 utilization by applications 310, 312 and 314 may become known and accurate.

According to embodiments of the invention, if monitoring application 340 obtains a notification that a resource, e.g., resource 320, has been compromised (e.g., attacked or breached, e.g. having had unauthorized access to its data or resources or having been controlled by an unauthorized user or entity), monitoring application 340 may generate an accurate list of all applications 310, 312 and 314 that have accessed resource 320 or have been accessed by resource 320 based on the map.

Monitoring application 340 may present the map in a graphical user interface (GUI) 346 (e.g., on one of output devices 740 depicted in FIG. 8), in a configuration selected by the user from, for example, per application presentation, per resource presentation, and a graph view. Other graphical representations may be used.

According to some embodiments, a per application presentation may include a table that contains a row for each application 310, 312 and 314, presenting resources 360 accessed by that application. For example, each row or other area may include succinct data for each connection or access of an application 310, 312 and 314 to a resource 360. Every row may be expandable to provide further descriptive information. According to some embodiments, a per application presentation may include a graphical representation of resources accessed by an application. Other organization of data may be used for presenting resources 360 accessed by an application 310, 312 and 314. Per resource presentation may include a table that contains a row for each resource 360, the row presenting applications 310, 312 and 314 that have accessed that resource 360. For example, a row of database 330 may provide a list of the applications 310, 312 and 314 that have accessed database 330. According to some embodiments, a per resource presentation may include a graphical representation of applications that have accessed a resource. Other organization of data may be used for presenting a list of applications 310, 312 and 314 that have accessed a single resource 360. A graph view may provide visualization of applications 310, 312 and 314, resources 360 and interconnections between them. The graph view may provide an overview or the big picture of system 300, including visualization of applications, resources and access between them. The graph view may enable a network supervisor (a user) to quickly determine potential security breaches across system 300. For example, if one resource, e.g., resource 324 is known to be breached, other resources 360 that may be affected may be visible by a graph connection between them and the affected resource 324.

Thus, embodiments of the invention may provide a tool for day-to-day usage monitoring and for examining a security breach. A chief risk officer (CRO) may use the graph view in order to map the security risks and investigate potential security breaches easily by viewing the mapped network. Information technology (IT) personnel may use the per resource presentation in case of server migration, and thus easily map the affected applications, services and technical owners.

According to embodiments of the invention, monitoring application 340 may provide access permissions to users for using applications 310, 312 and 314 and for accessing resources used by applications 310, 312 and 314. According to some embodiments, monitoring application 340 may allow some users or groups of users to use applications 310, 312 or 314 and may prevent other users from using those applications 310, 312 or 314. According to some embodiments, an application, e.g., application 310, may have to request permission from monitoring application 340 for a group of users to use, access or execute application 310 or resources 360 used by application 360. According to some embodiments, monitoring application 340 may approve the request only if the same group of users is reported by application 310 when application 310 is being executed and resources 360 is accessed. Otherwise, if, application 310 requests permission for a group of users to access a resource 360 but does not report access to that resource 360 when deployed, the request for permission may be denied. This permission mechanism may ensure that the reporting of resource 360 utilization by applications 310, 312 or 314 is accurate. For example, in case of inconsistency between the access permission requested by application 310 and the access report provided by application 310 upon execution, monitoring application 340 may not provide permissions for users to use application 310. If access permission request is denied, the programmers of application 310 may be motivated to add a command line that would provide a correct reporting of resource 360 utilization when application 310 is executed, so that the request for permissions will be granted.

For example, when a new application 310 is deployed for the first time, no users may have permission to use the new application 310. When executed for the first time, application 310 may report to monitoring application 340 which users need to be permitted to access which of resources 360 when using application 340. Only after the report is received by monitoring application 340, and based on the group of users and other metadata specified in the report, monitoring application 340 may issue permissions to users to use new application 310.

For example, a new application, e.g., application 310 is to be developed and integrated to the software ecosystem, e.g., to system 300. Application 310 may need to communicate with another application, e.g., application 312. In this scenario, application 310 needs to notify application 312 that a new data sample is ready to be used by application 312. The communication protocol between application 310 and application 312 in this example is Simple Queue Service (SQS, other protocols may be used). To implement reporting of the communication between application 310 and application 312, the appropriate library or package may be imported into application 310, and a single line of code may be added to application 310 below the part that is responsible for sending a message from the SQS queue. This line of code may report to monitoring application 340 that application 310 communicates with application 312 using SQS, at timestamp 123456. Monitoring application 340 may verify that application 310 is complying with all of the necessary security protocols.

According to embodiments of the invention, rules may be formulated to define how applications 310, 312 and 314 and resources 360 should interact. Current solutions typically provide strict rules that allow applications 310, 312 and 314 to communicate only using specific protocols and methods. Embodiments of the present application, however, provide a more robust, soft solution of custom defined rules. The rules may be formulated to provide the information regarding which applications 310, 312 and 314 are complying with security standards and which applications 310, 312 and 314 are reporting data fully. The rules may include logic describing allowed behavior of applications 310, 312 and 314 and resources 360. For example, the rules may define which applications 310, 312 and 314 are allowed to access which resources 360. If for example, an application 310, 312 and 314 reports access to a database that it is not allowed to access (this may happen for example if a programmer changes the application and does not require appropriate permissions), this would breach a rule and be highlighted. In another example, a rule may be defined to discover all applications that access a specific resource. In another example, rule logic may include "if database 330 type of application 310 is MySQL, then database 330 should have less than 100 days of data retention". According to some embodiments, some of the rules may be used for monitoring purposes. Monitoring application 340 may analyze the metadata provided in the self-reports against the set of rules to identify applications 310, 312 and 314 that do not comply with the rules. For example, monitoring application 330 may provide a report and/or an alert in case a rule is breached or may provide an indication in the graphical user interface which applications do not comply with one or more rules. Thus, applications 310, 312 and 314 may be allowed to break at least some or all the rules, however, in case a rule is breached, monitoring application 340 may notify the relevant CRO. For example, monitoring application 340 may highlight rows of applications 310, 312 and 314 and resources 360 that broke rules, or may otherwise provide an indication in case a rule is breached.

According to some embodiments, the monitoring application 340 may calculate a risk factor for an application 310, 312 and 314 or a resource 360 based on the map. The risk factor may provide an estimate of the general risk of attack the application 310, 312 and 314 or resource 360 are exposed to. For example, the risk factor may be determined or calculated based on the number, the type, the geographic location, and other parameters related to the access of the application 310, 312 and 314 or recourse 360 to other resources 360, as well as other risk factors such as the open source libraries used by the application 310, 312 and 314.

According to embodiments of the invention, monitoring application 340 may include a database 342, e.g., a NoSQL DB, to store the metadata of monitored applications 310, 312 and 314. In some embodiments the metadata may be semi-structured (e.g., may include tags or labels to separate semantic elements and enable a hierarchal relation between records and fields of the data), allowing new applications and services to report in a non-strict manner. Monitoring application 340 may further include a backend API 344 that may obtain reports from applications 310, 312 and 314, store the obtained information in database 342, retrieve information from database 342 and display the data in GUI 346. Data may be retrieved from database 342 using queries such as "all databases that application 310 interacts with". The retrieved data may be displayed by GUI 346 as disclosed herein.

According to embodiments of the invention, programmers may be provided with dedicated package or library, that may be implemented in the code of applications 310, 312 and 314 to provide the self-reporting upon accessing a resource 360.

Figure 4:
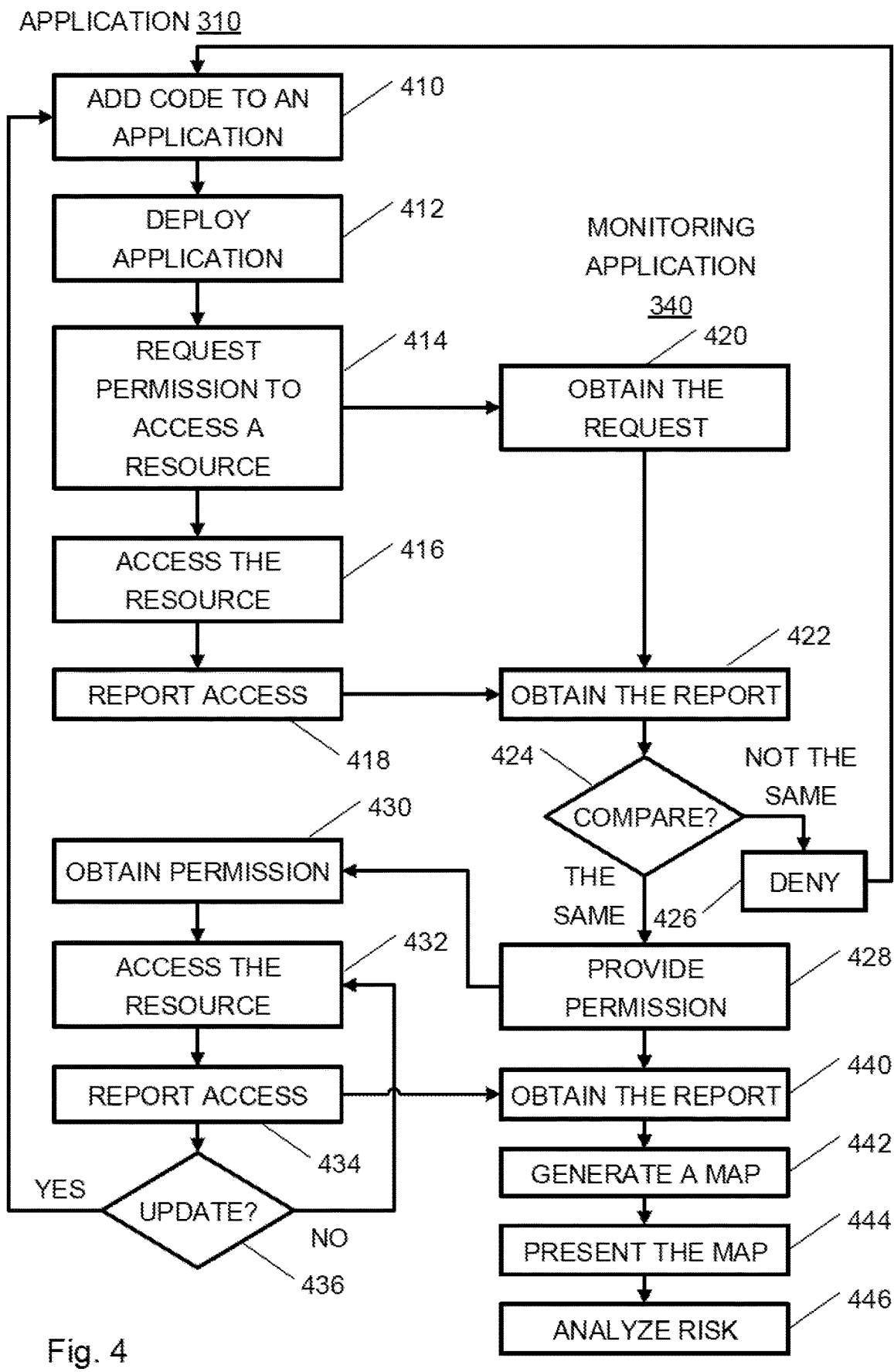
FIG. 4 is a flowchart of a method for real-time monitoring of resource usage, according to embodiments of the invention.

Reference is made to FIG. 4, which is a flowchart of a method for real-time monitoring of resource usage, according to embodiments of the invention. An embodiment of a method for real-time monitoring of resource usage, may be performed, for example, by the systems shown in FIGS. 1, 2, 3 and 6.

In operation 410, a programmer may insert code lines or software instructions into a software application (e.g., applications 310, 312 and 314), the code may be intended to report by the software application to a monitoring application (e.g., monitoring application 340), access of the software application to a resource (e.g., one of resources 360), and an identity of a user accessing the resource. In operation 412, the application may be deployed, e.g., executed on computer system 300. In operation 414 the software application may request from the monitoring application permission to access a resource by a user or a group of users. In operation 416, the software application may try to access the resource. At this stage, the application may not have yet a permission to access the resource or a permission to allow users to use the application. However, as indicated in operation 418, upon accessing the resource, the software application may report (e.g., as a result of executing the code inserted in operation 410) to the monitoring application the accessed resource, the accessing user or group of users, and other metadata. The report provided in operation 418 may be referred to herein as a self-report or runtime report.

In operation 420, the monitoring application may obtain from the software application the request for permission to access the resource by the user or group of users (sent by the software application in operation 414). In operation 420, the monitoring application may obtain from the software application the report of accessing the accessed resource by the accessing user or group of users (sent by the software application in operation 418). In operation 424, the monitoring application may compare the information obtained in operation 420 with the information obtained in operation 422. For example, the monitoring application may verify that the software application requests permission to access the same resource that the software reports it is actually accessing. In addition, the monitoring application may verify that the users that the application requests permission for are the same users that are reported upon access. According to some embodiments of the invention, the monitoring application may allow the request and provide a permission to access the resource by the requested users only if the requested resource is the accessed resource and the requested user (or group of users) is the accessing user (or group of accessing users), as indicated in operation 428. If, however, the permissions requested in operation 414 do not match the accessed resource or the accessing users, or if the runtime report of the actual accessed resource is not obtained by the monitoring application at all, the monitoring application may deny or refuse the request and not provide the requested permissions to the software application, as indicated in operation 426. In this case, the method may proceed to operation 410, since the programmer may be motivated to insert the required command lines to the software application so that the runtime report would match the requested permissions.

In operation 430, the software application may obtain the permissions granted by the monitoring application in operation 428. In operations 432 and 434 the software application may be executed, and while executing, the software application may access the resource (now with permissions), as indicated in operation 432, and report the access including the required metadata, as indicated in operation 434. In case of a software update, and specifically in case that new resources need to be accessed by the software application, as indicated in operation 436, the method may return to operation 410, to inserting the required command lines for proper reporting.

In operation 440, the monitoring application may continue to obtain runtime reports form the software application. In operation 442, the monitoring application may generate a map of software infrastructure utilization, e.g., of resources accessed by the software application. Since operations 410-418 and 430-436 may be performed by a plurality of applications in the monitored computer system, the monitoring application may generate a map of resources accessed by the plurality of applications. In operation 444, the map may be presented to a user, as disclosed herein. In operation 446, the monitoring application may analyze the risk for an attack on the computer system and resources within the computer system, based on the map generated in operation 442. For example, if one of the resources has been breached, compromised or attacked, the monitoring application may generate a list of all the other resources that have interacted with the infected resource, and therefore may have been also compromised or attacked or are under a risk of an attack. According to some embodiments, the monitoring application may calculate a risk factor or score for an application or a resource, based on the map. The risk factor or score may provide an estimate of the general risk of attack the application or resource are exposed to. For example, the risk factor or score may be determined or calculated based on the number, the type, the geographic location, and other parameters related to the access of the application or recourse to other resources, as well as other risk sources such as the open source libraries used by that application. In some embodiments, the risk factor or score of an application may depend also on the risk factor or score of the resources accessed by that application. For example, a risk factor or score of an application may equal the maximal risk factor or score associated with (e.g., given to) any of the resources accessed by that application.

Figure 5:
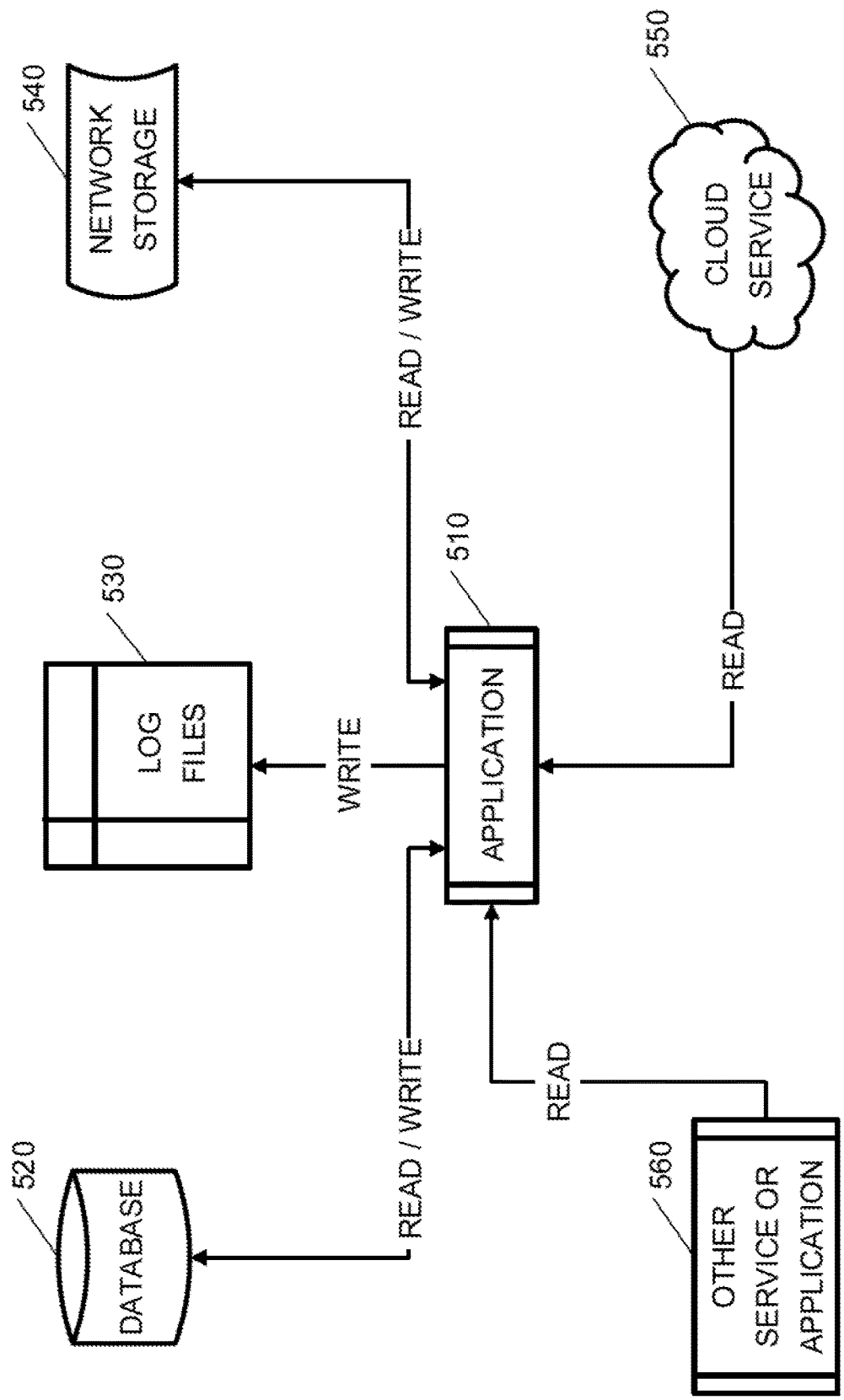
FIG. 5 depicts an example for a per application presentation, according to embodiments of the invention.
Figure 6:
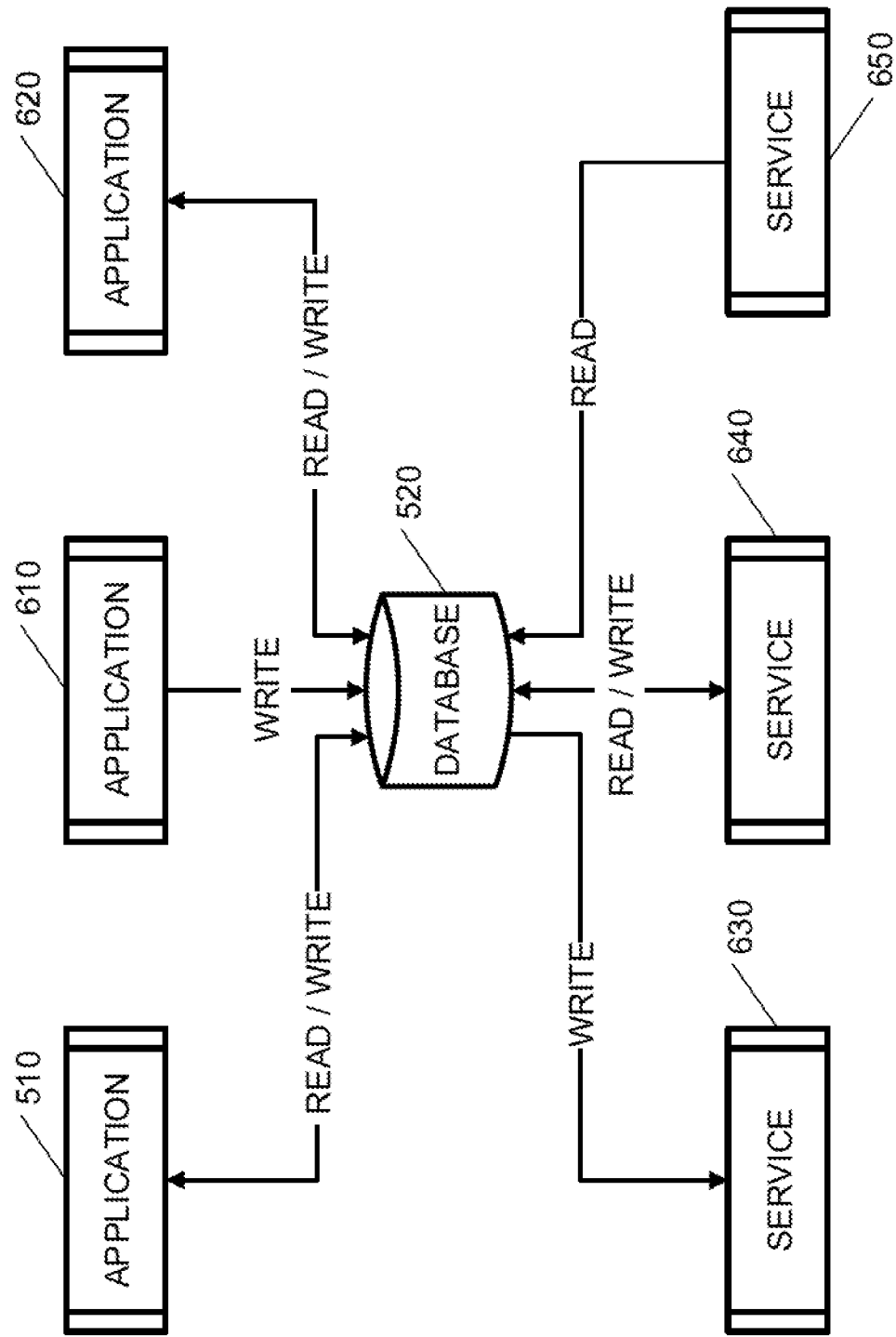
FIG. 6 depicts an example for a per resource presentation, according to embodiments of the invention.
Figure 7:
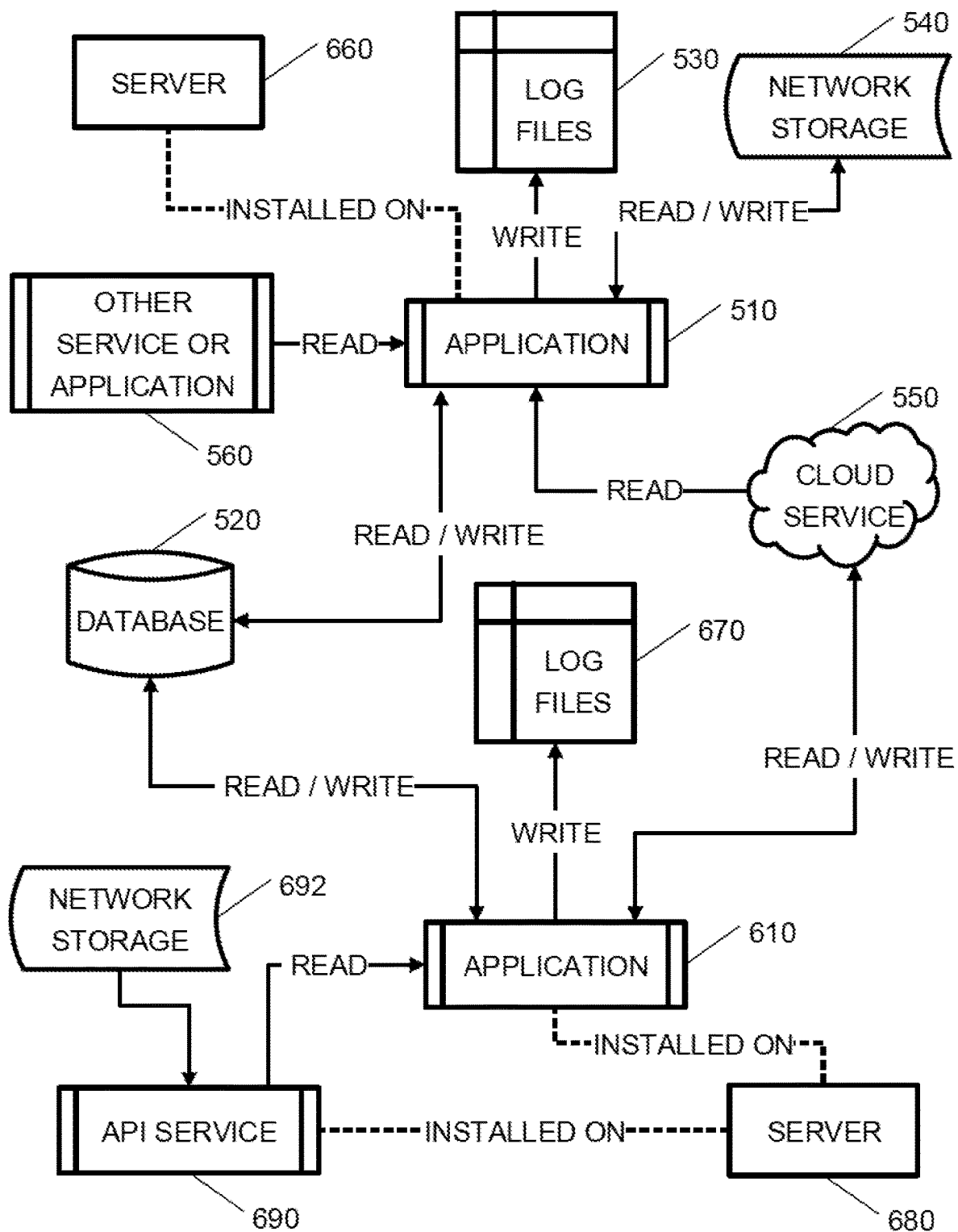
FIG. 7 depicts an example for a graph view, according to embodiments of the invention.

Reference is now made to FIGS. 5-7 which includes graphical representations of a system or network, according to embodiments of the invention. FIG. 5 depicts an example for a per application presentation, according to embodiments of the invention. FIG. 5 includes a graphical representation of an application 510, and resources accessed by application 510. The resources accessed by application 510 include, in this example, database 520, log files 530, network storage 540 a cloud service 550, and other service or application 560. Arrows drawn between application 510 and database 520, log files 530, network storage 540 a cloud service 550, and other service or application 560 indicated whether application 510 reads or writes form/to the resource.

FIG. 6 depicts an example for a per resource presentation, according to embodiments of the invention. FIG. 6 includes a graphical representation of a resource, in this case database 520, and applications and services that have accessed database 520. The applications and services that have accessed database 520 include, in this example, applications 510, 610 and 620, and services 630, 640 and 650. Arrows drawn between database 520 and applications 510, 610 and 620, and services 630, 640 and 650 indicated whether applications 510, 610 and 620 and services 630, 640 and 650 reads or writes form/to database 520.

FIG. 7 depicts an example for a graph view, according to embodiments of the invention. FIG. 7 includes a graphical representation of applications 510 and 610, resources and access between them. FIG. 7 presents a part of a system or network. The resources accessed by application 510 include, in this example, database 520, log files 530, network storage 540, cloud service 550, other service or application 560, and server 660. The resources accessed by application 610 include, in this example, database 520, log files 670, cloud service 550, server 680, and API service 690. API service 740 access network storage 692. It can be seen in the example presented in FIG. 7, that applications 510 and 610 share two resources, database 520 and cloud service 550. Thus, if for example, cloud service 550 is breached or compromised, it can be easily detected from the graph view presented in FIG. 7 that applications 510 and 610 may be at risk.

FIG. 8 illustrates an example computing device according to an embodiment of the invention. Various components such as resources 360 and other modules, may be or include computing device 700, or may include components such as shown in FIG. 8. For example, a first computing device 700 with a first processor 705 may be used to monitor resource usage in real-time, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud"). For example, computing device 700 may be included in cloud computing environment 50 depicted in FIGS. 1 and 2.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for real-time monitoring of resource usage, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD Recordable (CD-R) drive, a universal serial bus (USB) device or other suitable removable and/or fixed storage unit. Storage 730 may include or may store one or more databases including databases 330, 332, 334 and 342. In some embodiments, some of the components shown in FIG. 8 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for real-time monitoring of computer resource usage, the method comprising:
  inserting a dedicated command into software code of a software application following an original portion of the software code dedicated to accessing a computer resource, wherein the inserting occurs prior to the software application being executed for a first time on a computing environment and wherein no users have access to the software application prior to the dedicated command being inserted;
  receiving, by an external monitoring application that evaluates a plurality of software applications within the computing environment, a report from the software application that details a set of users that need to have access to a plurality of computer resources that includes the computer resource, wherein the dedicated command causes the software application to send the report;
  receiving, by the external monitoring application and via the dedicated command in response to the software application accessing the computer resource, metadata describing the access; and
  identifying, by the monitoring application and using metadata of the access to the resource, a manner in which a computer environment that hosts the software application has been compromised.

2. The method of claim 1, comprising:
  receiving a request, from the software application, for a permission to access the resource by a user accessing the resource.

3. The method of claim 1, wherein the metadata comprising at least one of: a timestamp and a protocol.

4. The method of claim 1, wherein the resource is selected from the list consisting from: a database, a server, and a computer-executed software application.

5. A method for real-time monitoring of resource usage, the method comprising:
  inserting a plurality of dedicated commands into software code of a plurality of software applications following respective original portions of respective software code dedicated to accessing any of a plurality of computer resources, wherein the inserting occurs prior to the plurality of software applications being executed for a first time on a computing environment and wherein no users have access to the plurality of software applications prior to the plurality of dedicated commands being inserted;
  obtaining, by a monitoring application and via the plurality of dedicated commands of the plurality of software applications, a report that details a set of users that need to have access to the plurality of computer resources and metadata regarding and responsive to accessing of at least one of the plurality of resources; and
  generating, by the monitoring application based on the metadata, a map of resources accessed by the plurality of software applications.

6. The method of claim 5, comprising:
  obtaining, by the monitoring application, a notification that the at least one resource has been compromised; and
  generating a list of all software applications that have accessed the at least one resource based on the map.

7. The method of claim 5, comprising:
  obtaining, by the monitoring application, via a respective dedicated command of a respective software application of the plurality of software applications, a report of an accessing user accessing an accessed resource of the plurality of resources, wherein the respective software application is not permitted to access the accessed resource;

obtaining, by the monitoring application from the respective software application, a request to permit access to a requested resource of the plurality of resources by a requested user; and allowing, by the monitoring application, the access by the requested user to the requested resource in response to determining that the requested resource is the accessed resource and the requested user is the accessing user.

8. The method of claim 5, comprising:

presenting the map in a graphical user interface, wherein the map includes at least one of:
  resources of the plurality of resources accessed by each software application of the plurality of software applications,
  applications of the plurality of software applications that have accessed each resource of the plurality of resources, and
  a graph view presenting visualization of software applications, resources and access between them.

9. The method of claim 5, wherein the metadata comprising at least one of: a timestamp and a protocol.

10. The method of claim 9, the method comprising:
analyzing the metadata against a plurality of rules; and
indicating in a graphical user interface which software applications do not comply with a rule of the plurality of rules.

11. The method of claim 5, comprising calculating a risk factor of a resource of the plurality of resources based on the map.

12. The method of claim 11, wherein the risk factor equals a maximal risk factor associated with any resources of the plurality of resources accessed by respective software applications.

13. A system for real-time monitoring of resource usage, the system comprising:

a memory; and a processor configured to:
  insert a plurality of dedicated commands into software code of a plurality of software applications following original respective portions of respective software code dedicated to accessing any of a plurality of computer resources, wherein the inserting occurs prior to any of the software application being executed for a first time on a computing environment and wherein no users have access to any of the plurality of software applications prior to the respective dedicated commands being inserted;
  receive, by an external monitoring application that evaluates the plurality of software applications within the computing environment, reports from each of the plurality of software applications that details a set of users that need to have access to the plurality of computer resources, wherein the dedicated command causes each of the plurality of software applications to send respective reports;
  obtain, via the plurality of dedicated commands of the plurality of applications, metadata regarding and responsive to accessing of at least one accessed resource by at least one accessing user; and
  generate, based on the metadata, a map of resources accessed by the plurality of software applications.

14. The system of claim 13, wherein the processor is configured to:
obtain a notification that the at least one resource has been compromised; and
generate a list of all software applications that have accessed the at least one resource based on the map.

15. The system of claim 13, wherein the processor is configured to:
obtain, via a respective dedicated command of a respective software application, a report of an accessing user accessing an accessed resource of the plurality of resources, wherein the respective software application is not permitted to access the accessed resource:
obtain, from the respective software application, a request to permit access to a requested resource of the plurality of resources by a requested user; and
allow the access by the requested user to the requested resource in response to determining that the requested resource is the accessed resource and the requested user is the accessing user.

16. The system of claim 13, wherein the processor is configured to:
present the map in a graphical user interface, wherein the map includes at least one of:
  resources of the plurality of resources accessed by each software application of the plurality of software applications,
  applications of the plurality of software applications that have accessed each resource of the plurality of resources, and
  a graph view presenting visualization of software applications, resources and access between them.

17. The system of claim 13, wherein the metadata comprising at least one of: a timestamp and a protocol.

18. The system of claim 17, wherein the processor is configured to:
analyze the metadata against a plurality of rules; and
indicate in a graphical user interface which software applications do not comply with a rule of the plurality of rules.

19. The system of claim 17, wherein the processor is configured to calculate a risk factor of a resource of the plurality of resources based on the map.

* * * * *